INVENTORS
HARRY W. DIETERT
JOSEPH S. SCHUMACHER
BY Whittemore,
Hulbert & Belknap
ATTORNEYS

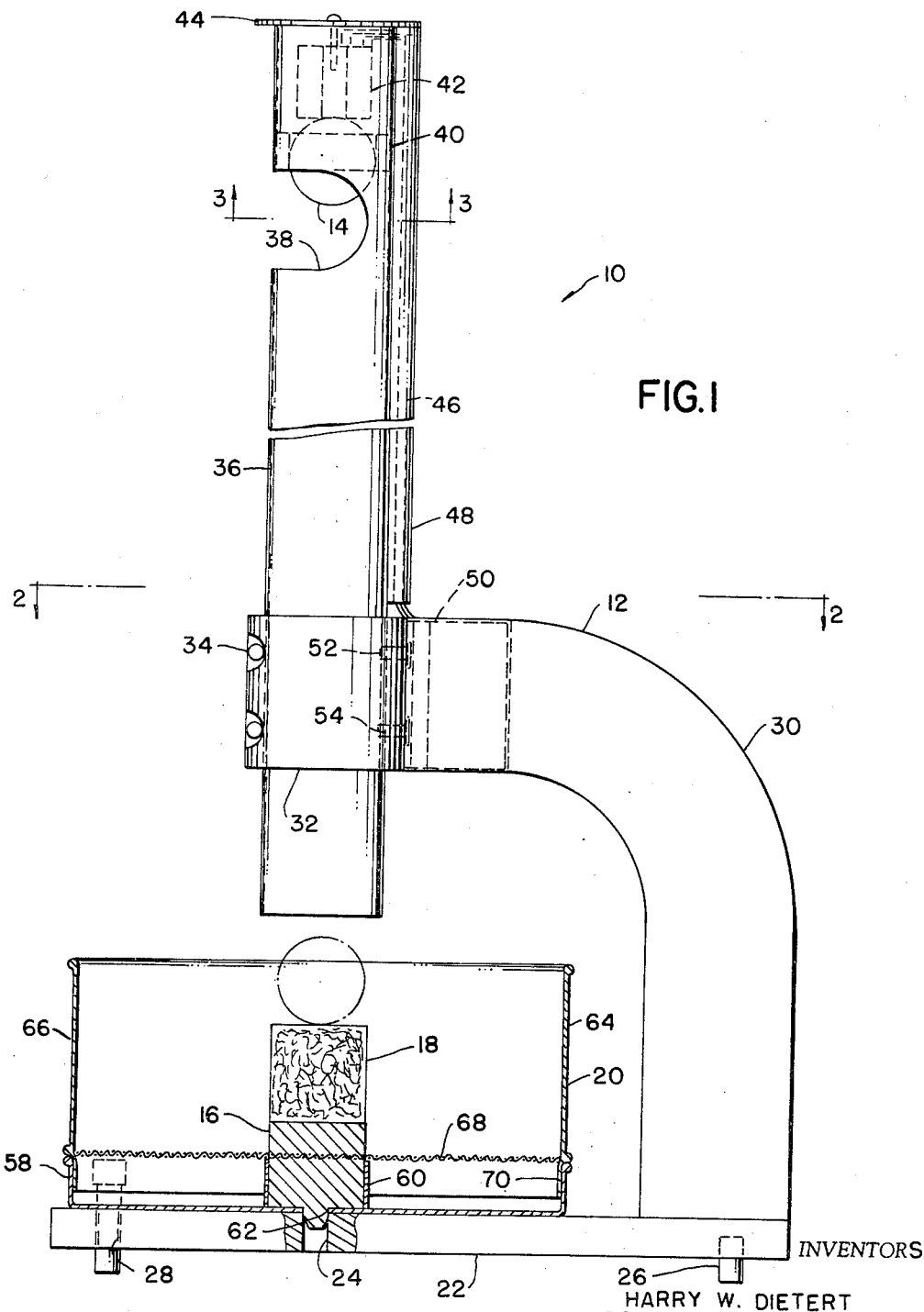

United States Patent Office 3,488,991
Patented Jan. 13, 1970

3,488,991
STRUCTURE FOR AND METHOD OF
SHATTER TESTING
Harry W. Dietert, Kerrville, Tex., and Joseph S. Schumacher, Cincinnati, Ohio, assignors to Harry W. Dietert Co., Detroit, Mich., a corporation of Michigan
Filed Nov. 16, 1967, Ser. No. 683,625
Int. Cl. G01n 3/62
U.S. Cl. 73—12    5 Claims

ABSTRACT OF THE DISCLOSURE

An electromagnet for supporting a weight above an anvil on which a test specimen is positioned, a switch for deenergizing the electromagnet to drop the weight on the test specimen whereby the test specimen is shattered, a tube positioned between the electromagnet and anvil through which the weight is dropped to insure the air through which the weight is dropped is still, and a screen surrounding the anvil for retaining portions of the shattered specimen over a predetermined size for weighing as a measure of the toughness of the test specimen material, and the method of testing the toughness of the specimen, including supporting a weight over a test specimen, dropping the weight on the test specimen, and determining the toughness of the test specimen in accordance with the degree of shattering of the test specimen.

BACKGROUND OF THE INVENTION

Field of the invention

The invention relates to material testing structure and methods and refers more specifically to structure for and a method of determining the toughness of plastic and semi-plastic materials, in accordance with the degree of shattering of a test specimen of the material due to dropping of a weight thereon.

Description of the prior art

The testing of the toughness of material, such as foundry sand, has taken many forms. For example, an experienced foundry man may use a test consisting primarily of feeling the mixed foundry sand. In addition, impact indentation test, moldability tests and the like have been suggested for determining the toughness of such materials.

The only known shatter test of the toughness of such materials is accomplished by dropping a sample of a material from a predetermined height and determining the toughness of the material in the specimen from the shattering thereof on impact with an anvil placed beneath the test specimen. The results of such shatter tests are not uniformly reproducible and must therefore include substantial inaccuracies due to, for example, tumbling of the specimen in its fall, whereby the specimen never hits the same way twice. Also, such tests have been deficient in that for the tougher materials, excessive height may be required to perform the shatter test with light tough materials.

SUMMARY OF THE INVENTION

The shatter testing structure of the invention includes means for releasably supporting a weight over an anvil on which a test specimen is positioned, means for releasing the weight and for dropping the weight through still air into contact with a specimen of material to be tested to produce shattering thereof and means surrounding the anvil for collecting pieces of the shattered specimen having at least a predetermined dimension.

The method of determining the toughness of plastic or semi-plastic material in accordance with the invention includes supporting the weight above the anvil, releasing the weight to allow the weight to fall on the specimen and shatter it, collecting the portions of the specimen having at least a predetermined dimension and weighing them to provide an indication of the toughness of the material tested.

BRIEF DESCRIPTION OF THE DRAWINGS

FIGURE 1 is a broken and partly broken away elevation view of structure for shatter testing specimens of plastic or semi-plastic material constructed in accordance with the invention.

DESCRIPTION OF THE PREFERRED EMBODIMENT

Figure 2:
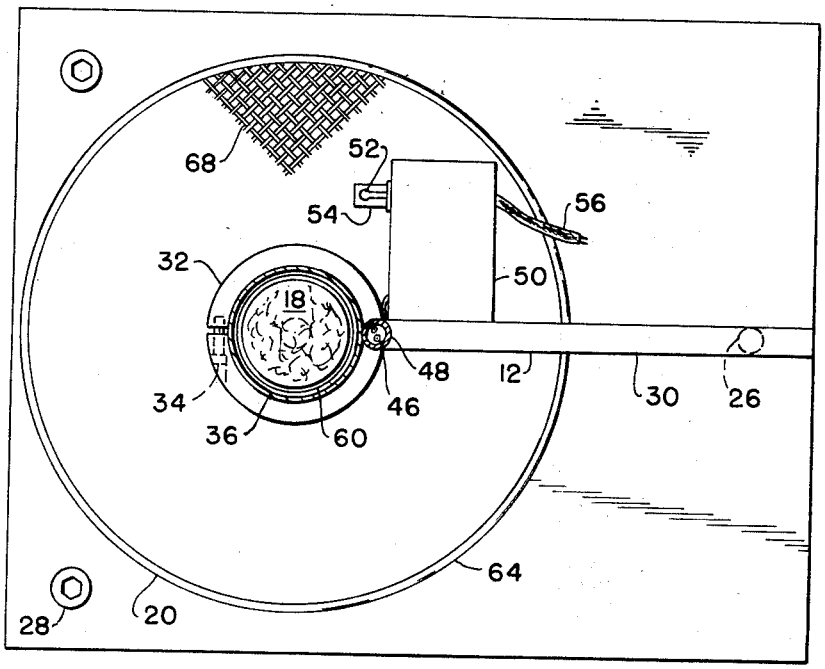
FIGURE 2 is a transverse section view of the shatter testing apparatus illustrated in FIGURE 1 taken substantially on the line 2—2 in FIGURE 1.

The shatter testing structure 10, illustrated in the drawings, includes the means 12 for supporting a weight 14 over an anvil 16 for dropping on a test specimen 18 positioned on the anvil 16 to shatter the test specimen 18. The structure 10 further includes the means 20 for separating the particles of the shattered test specimen 18 in accordance with the size thereof as a measure of the toughness of the test specimen 18.

The structure 12 for releasably supporting the weight 14 includes a rectangular metal base plate 22 having a central opening 24 therethrough for aligning the anvil 16 with the weight 14. The base 22 is supported on the leg member 26 at the rear thereof and includes adjusting screws 28 extending therethrough at the front thereof for exact alignment of the weight 14 over the anvil 16.

An inverted J-shaped metal support 30 is secured at its lower end to the base plate 22 by convenient means, such as brazing. A split cylindrical collar 32 is secured to the upper end of the support 30, again by convenient means, such as brazing. Screws 34 are provided extending between the parts of the collar 32 for tightening the collar 32 about a tube 36 which is carried by and supported on the collar 32.

Tube 36 is positioned directly over the anvil 16. A transverse opening 38 is provided in the tube 36 through which the weight 14 is inserted into the upper end of the tube 36, as shown in FIGURE 1. An annular guide 40 is secured in the upper end of the tube 36. The weight 14 which may be a stainless steel ball is exactly positioned by the guide 40 centrally of the tube 36, whereby when it is dropped, it will pass through the tube 36 without tumbling or engaging the sides of the tube 36 to fall uniformly on the specimen 18.

Figure 3:
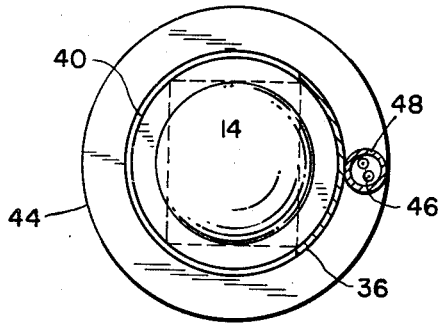
FIGURE 3 is an enlarged, transverse cross section of the shatter testing structure illustrated in FIGURE 1 taken substantially on the line 3—3 in FIGURE 1.

An electromagnet 42 is secured to an electromagnet holder 44 secured over the top of the tube 36, as shown in FIGURES 1 and 3. The electromagnet is energized through conductors 46 passing through a conduit 48 secured as by brazing to the tube 36 in the position shown. The conductors 46 extend into the control box 50 which is secured on the upper end of the support 30 of the shatter testing structure 10 by convenient means, such as screws. The control box 50 is provided with an on-off switch 52, a light 54, and is connected through conductors 56 to a source of electrical energy. The electromagnet is energized and deenergized by turning the switch 52 on and off respectively.

The structure 20 for collecting the particles of the shattered test specimen 18 includes a lower pan 58 having a collar 60 centrally thereof and an opening 62 through the center thereof concentric with the collar 60 for receiving the bottom of the anvil 16 in aligned position under the tube 36. The structure 20 further includes the screen 64 having the cylindrical sides 66 surrounding the upper portion of the anvil 16 and a test specimen 18 positioned thereon and the screen member 68 extending transversely thereof, as shown best in FIGURE 1. The anvil 16 extends through the screen member 68 and is brazed thereto. The screen 64 is aligned with the pan 58 by the downwardly extending portion 70 of the cylindrical sides thereof extending into the pan 58.

In performing a shatter test, a specimen 18 of plastic or semi-plastic material, such as foundry sand, refractory mortars and lining material, and building trade mortar or the like, which in the case of molding sands, in foundry operations may be an American Foundry Society specimen which is rammed to a two inch diameter by two inch height, is positioned on the anvil 16 with the screen 64 in the pan 58 and both the screen 64 and pan 58 positioned on the base 22 in alignment beneath the tube 36, as shown in FIGURE 1. The switch 52 is turned on to energize the electromagnet 42 and the stainless steel spherical weight 14 is positioned in the guide 42 and held in position by the electromagnet 42.

The switch 52 is then opened, whereby the electromagnet 42 is deenergized and the weight 14 is caused to fall under the influence of gravity straight through the tube 36 to hit the specimen 18 and shatter it. The shattered specimen 18 will fall on the screen member 68 and a portion of it will fall through the screen member 68 into the pan 58. The portion falling into the pan 58 will be determined by the size of the mesh of the screen member 68, which as previously indicated may be three-eighths of an inch square. For a given screen mesh and ball weight the portion of the specimen 18 falling through the screen will be determined by the toughness of the specimen. The weight of material retained on the screen 68 may then be used as a toughness indication or the weight of the material on the screen 68 may be related to the total weight of the test specimen to provide a toughness percentage as desired.

The tube 36 assures a drop of the weight 14 without influence of air currents to provide a repeatable impact of the weight 14 on the test specimen 18. In order to test a full range of test specimens, it is only necessary to use a weight heavy enough to shatter the toughest test specimen. If desired, different weights for different toughness scales may be used. Thus, a relatively light weight may be used for shatter testing materials, having a relatively low toughness and a relatively heavy weight may be used to shatter test specimen of materials having a high toughness with accompanying separate toughness scales.

What we claim as our invention is:

1. Structure for shatter testing a specimen of foundry sand or the like, comprising an anvil for supporting the specimen, means positioned above the anvil for releasably supporting a weight above the specimen and dropping the weight on the specimen to shatter it, and means positioned adjacent and operably associated with the anvil for receiving and separating the portions of the shattered test specimen having at least a predetermined dimension from the rest of the shattered test specimen as a measure of toughness of the test specimen, including a pan surrounding the lower portion of the anvil and a screen surrounding the upper portion of the anvil having a screen member bottom to which the anvil is secured, which screen is positioned within the first pan.

2. Structure as set forth in claim 1, wherein the means for releasably supporting the weight above the anvil includes means for centering the weight above the anvil.

3. Structure as set forth in claim 2, wherein the weight is spherical and the means for centering the weight is an annular guide.

4. Structure as set forth in claim 1, wherein the weight is a metal ball and the means for releasably supporting the weight above the anvil includes an electromagnet.

5. Structure as set forth in claim 1, wherein the means for releasably supporting the weight above the anvil includes a tube positioned over and vertically aligned with the anvil having a transverse opening therein adjacent the top thereof through which the weight is dropped.

References Cited

UNITED STATES PATENTS

| | | | |
|---|---|---|---|
| 1,459,143 | 6/1923 | Curran | 73—12 XR |
| 2,264,412 | 12/1941 | Shindel | 73—12 |
| 2,281,324 | 4/1942 | Preston | 73—12 |
| 2,644,328 | 7/1953 | Robinson et al. | 73—12 XR |
| 2,648,975 | 8/1953 | Eves | 73—12 |
| 2,995,026 | 8/1961 | Schmidt | 73—12 |

CHARLES A. RUEHL, Primary Examiner

U.S. Cl. X.R.

73—79